United States Patent
Taira et al.

(10) Patent No.: US 7,990,942 B2
(45) Date of Patent: Aug. 2, 2011

(54) WIRELESS DATA COMMUNICATION METHOD FOR A BASE STATION USING A COMMON PILOT CHANNEL AND AN INDIVIDUAL PILOT CHANNEL

(75) Inventors: Masanori Taira, Yokohama (JP); Kenzaburo Fujishima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1346 days.

(21) Appl. No.: 11/508,200

(22) Filed: Aug. 23, 2006

(65) Prior Publication Data

US 2007/0195736 A1 Aug. 23, 2007

(30) Foreign Application Priority Data

Feb. 23, 2006 (JP) .................................. 2006-046238

(51) Int. Cl.
*H04J 3/00* (2006.01)
(52) U.S. Cl. ........ 370/345; 370/330; 370/326; 370/336; 455/25; 455/63.4; 455/562.1
(58) Field of Classification Search .................. 370/336, 370/345, 326, 330; 455/562.1, 25, 63.4
See application file for complete search history.

(56) References Cited

U.S. PATENT DOCUMENTS

| | | | | |
|---|---|---|---|---|
| 6,330,460 B1 * | 12/2001 | Wong et al. | ................. | 455/562.1 |
| 6,778,507 B1 | 8/2004 | Jalali | | |
| 6,895,258 B1 * | 5/2005 | Scherzer et al. | ............ | 455/562.1 |
| 7,016,649 B1 * | 3/2006 | Narasimhan et al. | ........ | 455/63.1 |
| 7,099,384 B1 * | 8/2006 | Jalali et al. | ..................... | 375/229 |
| 7,400,606 B2 * | 7/2008 | Padovani et al. | .............. | 370/335 |
| 7,453,854 B2 * | 11/2008 | Fujishima et al. | ............ | 370/335 |
| 7,539,458 B2 * | 5/2009 | Jafarkhani et al. | ........... | 455/63.1 |
| 7,627,298 B2 * | 12/2009 | Taira et al. | .................. | 455/226.1 |
| 2001/0040933 A1 * | 11/2001 | Eriksson et al. | .............. | 375/350 |
| 2002/0154616 A1 * | 10/2002 | Aoyama et al. | ................ | 370/335 |
| 2002/0177468 A1 * | 11/2002 | Takeuchi et al. | .............. | 455/562 |
| 2004/0132494 A1 * | 7/2004 | Tirkkonen et al. | ......... | 455/562.1 |
| 2004/0204106 A1 * | 10/2004 | Gurelli et al. | .............. | 455/562.1 |
| 2004/0204108 A1 * | 10/2004 | Etkin et al. | ................. | 455/562.1 |
| 2009/0296563 A1 * | 12/2009 | Kishiyama et al. | ........... | 370/210 |

FOREIGN PATENT DOCUMENTS

| | | |
|---|---|---|
| JP | 11-252614 | 9/1999 |
| JP | 2002-314481 | 10/2002 |
| JP | 2003-304577 | 10/2003 |
| JP | 2003-529962 | 10/2003 |
| JP | 2003-338803 | 11/2003 |
| JP | 2004-508744 | 3/2004 |
| JP | 2004-165834 | 6/2004 |
| JP | 2005-143148 | 6/2005 |

* cited by examiner

*Primary Examiner* — Rafael Pérez-Gutiérrez
*Assistant Examiner* — Allahyar Kasraian
(74) *Attorney, Agent, or Firm* — Antonelli, Terry, Stout & Kraus, LLP.

(57) ABSTRACT

Data transmission is performed using the most suitable data rate for the radiation pattern of an antenna. Using an individual pilot channel of a first slot, a base station transmits a pilot signal in a specified direction with a beam pattern having narrow directivity. A wireless terminal located in that direction receives the pilot signal and determines a data rate according to the reception quality of the pilot signal. The wireless terminal transmits to the base station a signal requesting the determined data rate. The base station receives that signal and, based on the requested data rate, transmits data to the wireless terminal with a beam pattern in the same direction as the direction in which the pilot signal was transmitted, using a data channel of a second slot, which occurs a predetermined number of slots after the first slot.

5 Claims, 9 Drawing Sheets

WIRELESS DATA COMMUNICATION METHOD FOR A BASE STATION USING A COMMON PILOT CHANNEL AND AN INDIVIDUAL PILOT CHANNEL

BACKGROUND OF THE INVENTION

The present invention relates to wireless communication methods, base stations, and wireless communication systems. In particular, the present invention relates to a wireless communication method, a base station, and a wireless communication system in which a base station for performing cellular communication is an array-antenna wireless device provided with a plurality of antennas and generates beams in a time-division manner to perform packet transmission.

The antennas used in base stations of cellular systems are directional antennas for forming sectors; some of them do not include array antennas for segmenting the sectors further. Each base station uses the same frequency channel, and therefore, crosstalk with other base stations causes interference. The base stations transmit pilot signals, and a mobile station receives these signals and measures the respective signal levels. At the mobile station, it is possible to calculate the C/I ratio (the ratio of carrier power to interference power) from the measured signal level and to calculate a forward-link transmission data rate from the calculated C/I ratio. The calculated transmission rate is then wirelessly transmitted to the nearest base station. Then, based on this information, one of a plurality of modulators provided at the base station specifies the data rate selected by the mobile station to modulate user information coming from a network. The modulated signal is transmitted as a wireless signal from the antenna of the base station using the same radiation pattern (for example, a sector pattern) as the pilot signal.

One example of a cellular system is a CDMA2000 1xEV-DO system. Detailed specifications of this system are available in The Third Generation Partnership Project 2 (3GPP2) Specifications, C.S0024-v4.0, "cdma2000 High Rate Packet Data Air Interface Specification" (online document accessed on Aug. 29, 2005, URL: http://www.3gpp2.org/public_html/specs/tsgc.cfm). In this system, a pilot channel and a data channel transmitted from a base station are time-division multiplexed. In a mobile station, a forward-link transmission data rate is successively calculated from the C/I ratio of the time-division multiplexed pilot signal, and the data rate is successively requested from the base station. That document contains no specifications regarding formation of a radiation pattern by an array antenna and a method of determining the forward-link data rate in a system using such a pattern, nor do the other documents.

A method of determining the forward-link data rate of a base station using an array antenna in a CDMA2000 1xEV-DO system is disclosed in Japanese Unexamined Patent Application Publication No. 2003-304577. In the disclosed method, a plurality of base stations transmit pilot signals using array antennas. Mobile stations receive the pilot signals from the plurality of respective base stations, estimate their propagation paths, and transmit propagation path information to the base stations. The base stations estimate the forward-link reception quality using the propagation path information received from the mobile stations and determine the forward-link transmission rates to the mobile stations.

Another method is disclosed in Japanese Unexamined Patent Application Publication No. 2004-165834. In this method, a base station transmits a reference signal (pilot signal) to a mobile station using an array antenna in a directional manner. The mobile station measures a signal-to-interference ratio (SIR; the ratio of desired signal to interference signal) from the received reference signal and transmits SIR to the base station. The base station applies adaptive modulation and encoding to packet data based on the received SIR. The base station transmits the modulated packet data to the mobile station with the same directivity as that used to transmit the reference signal; however, the directivity is not switched until transmitting the packet data.

Wireless communication systems which perform communication using narrow beam patterns for partitioning into sectors and which estimate the interference power from a pilot signal transmitted with a plurality of beam patterns to estimate the C/I ratios and obtain forward-link data rates have also been disclosed (for example, see Japanese Unexamined Patent Application Publication No. 2003-338803). Japanese Unexamined Patent Application Publication No. 2005-143148, which is a divisional application of Japanese Unexamined Patent Application Publication No. 2003-338803, discloses a similar technology.

Communication systems which scan a plurality of beam patterns, before determining the antenna pattern for transmitting data, and which select the best beam pattern for the terminal for transmission have also been disclosed (for example, see Japanese Unexamined Patent Application Publication No. Hei-11-252614).

SUMMARY OF THE INVENTION

In the CDMA2000 1xEV-DO system, because the pilot signal and the user data signal are transmitted using the same fixed antenna pattern, the propagation path of the user data transmission is estimated from the pilot signal. However, this condition does not hold in a base station having an array antenna, where the user data signal is transmitted using an individual antenna pattern. Therefore, it is difficult to predict the reception quality of the user data signal from the pilot signal. For example, the base station transmits the pilot signal to a mobile station as an omnidirectional pattern to estimate the propagation path. On the other hand, the base station transmits the user data signal to the mobile station in a directional manner via the antenna array, for example, using a sector pattern or beam pattern. Therefore, the level of interference or the like during transmission of the user data signal is sometimes different from that during transmission of the pilot signal. In such a case, it is difficult to accurately predict the reception quality during transmission of the user data signal based on the reception quality of the pilot signal. Therefore, it is not possible to accurately estimate a transmittable data rate, thus decreasing the throughput.

In the method disclosed in Japanese Unexamined Patent Application Publication No. 2003-304577, since the mobile station must measure the reception levels of the plurality of pilot signals transmitted from the plurality of base stations, the processing load on the mobile station increases. Moreover, because the base stations determine the forward-link transmission rates, the mobile station must have a plurality of demodulation circuits so that it can demodulate signals at all transmission rates, which may increase the size of the circuit. In addition, it is not always possible to predict the antenna pattern of the nearby base stations when the user data signal is transmitted. Therefore, there is a possibility that it is not possible to accurately estimate the transmission data rate according to the actual communication quality when the user data signal is transmitted.

In the method disclosed in Japanese Unexamined Patent Application Publication No. 2004-165834, after transmitting the reference signal (pilot signal) in a directional manner, the same directivity is maintained until the packet data is transmitted in a directional manner. With this method, it is not possible to switch beams in a desired direction in slot units, and it is therefore difficult to improve the spatial utilization factor thereof. Also, one reason for the changing reception quality is the effect of a change in the beam direction of another cell or another sector. Since there is some time lag from the time when the reception quality is measured to the time when the user data signal is actually transmitted, the beam direction of another cell or another sector transmitted from the same base station may change during this period. In Japanese Unexamined Patent Application Publication No. 2004-165834, the directivity is maintained until the packet data is transmitted in a directional manner. Therefore, if the level of interference varies due to a change in the beam direction of another cell or another sector during the period until completion of packet data transmission, for example, there is a possibility that it is not possible to accurately estimate the transmission data rate based on the actual communication quality.

In the first embodiment of Japanese Unexamined Patent Application Publication No. 2003-338803, the reception quality, including the interference power, when receiving the beam pilot signal and the reception quality, including the interference power, when receiving the data channel signal are not necessarily the same. As a way to overcome this problem, temporal and spatial packet scheduling is performed so that base stations cooperate with each other to obtain the highest signal quality. With this assumption, the terminals (mobile stations) use a method of determining the C/I ratios based on the largest pilot signal level of the connected base stations and the smallest pilot signal level of the interfering base stations. This method, however, has the following problems.

First, interference between sectors is not disclosed. Specifically, interference from other sectors of the same base station is not disclosed in Japanese Unexamined Patent Application Publication No. 2003-338803. Because the interference power output from other sectors is not correlated with the sector in question, the reception quality of the pilot signal and the reception quality of the data channel are not necessarily the same. Second, cooperation between base stations is necessary. With the method described in Japanese Unexamined Patent Application Publication No. 2003-338803, it is assumed that there is cooperation among base stations to minimize the interference power by scheduling. Third, a lot of processing is required at the terminals (mobile stations). With the method described in Japanese Unexamined Patent Application Publication No. 2003-338803, the reception qualities of the pilot signal and the data channel signal may differ. Therefore, the desired carrier power C and the interference power I must be measured individually and then the C/I ratio must be estimated by calculation. Accordingly, the interference power I must be measured individually for the plurality of beams of the plurality of adjacent base stations, which increases the required processing resources. As a result, the processing load at the terminals (mobile stations) becomes extremely large. Another problem with this method is that there is an implicit assumption that the interference power I is a single signal component. However, under actual propagation conditions, multiple paths occur due to reflections from buildings and the like, and the interference power I includes numerous multipath signal components. Furthermore, there is a restriction in measuring those multipath signal components, and additional processing resources are necessary to measure all components included in the interference power I. There is therefore a risk of the circuit size increasing.

In the second embodiment of Japanese Unexamined Patent Application Publication No. 2003-338803, a method is used in which there is no cooperation between base stations, unlike the method in the first embodiment, and the C/I ratios at terminals (mobile stations) are estimated in a different way. Similarly to the first embodiment, however, the reception quality of the pilot signal and the reception quality of the data channel may still differ. Therefore, it may not necessarily be possible to accurately estimate the C/I ratios.

With the technique described in Japanese Unexamined Patent Application Publication No. Hei-11-252614, only scanning is performed, and the forward-link beam pattern timing of the pilot signal and the data channel signal is not specified. Therefore, when considering the interference from other sectors of the base station in question, as well as interference from other base stations, the reception qualities of the pilot signal and the data channel signal may not be the same. This is because scans are performed individually for the respective sectors and base stations, and the interference conditions may change in each scan.

In light of the circumstances described above, an object of the present invention is to provide a wireless communication method, a base station, and a wireless communication system which transmit data using the most suitable data rate for the radiation pattern of an antenna, the data rate being used for the forward link from the base station to a mobile station. Another object of the present invention is to improve throughput. A further object of the present invention is to use the same radiation beam pattern for both packet data transmission and pilot signal transmission.

One configuration which the present invention provides is a wireless communication system including at least one mobile station (wireless terminal) and a base station. The wireless communication system performs a first step of determining a radiation pattern at transmission time of a user data signal based on requested rates of the plurality of mobile stations; a second step of transmitting a pilot signal using the same radiation pattern at a time prior to the time at which the user data signal is transmitted; a third step of receiving the pilot signal in the mobile station and estimating the propagation path thereof; a fourth step in which the mobile station determines the data rate of a forward-link user data signal to be received from the base station, based on the estimated propagation path information; a fifth step of requesting the forward-link data rate determined by the mobile station from the base station; and a sixth step of transmitting the user data signal using the data rate requested by the mobile station and using the radiation pattern determined in the first step.

Another configuration that the present invention provides is a wireless communication system according to that described above, wherein the wireless communication system also performs a seventh step of time-division multiplexing and transmitting a common pilot signal, which is transmitted using a radiation pattern that reaches all of the plurality of mobile stations, and an individual pilot signal, which is transmitted in the second step.

In another configuration that the present invention provides, the base station operate at each sector of a plurality of sectors included in the base station, at the same slot timing in the wireless communication system described above.

In another configuration that the present invention provides, a plurality of base stations are synchronized and operate at the same slot timing in the wireless communication system described above.

According to the first solving means of this invention, there is provided a wireless communication method in which a radiation pattern is specified for each channel in a time-division manner for communication between a base station and a wireless terminal, comprising the steps of:

in a first slot that includes a common pilot channel transmitted to the wireless terminal in an omnidirectional manner or in a directional manner corresponding to a sector, an individual pilot channel transmitted with a specific beam pattern among a plurality of beam patterns, and a data channel for transmitting data to the wireless terminal with the beam pattern, the base station performing control, including synchronization, using the common pilot channel of the first slot and transmitting a pilot signal with a radiation pattern including the beam pattern in the direction in which the wireless terminal is located, using the individual pilot channel of the first slot;

the wireless terminal, located in the direction, receiving the pilot signal and determining a data rate according to the reception quality of the pilot signal;

the wireless terminal transmitting to the base station a signal for requesting the determined data rate;

the base station receiving the signal and, based on the requested data rate, transmitting data to the wireless terminal with the radiation pattern, which includes the beam pattern in the same direction as the direction in which the pilot signal was transmitted, using a data channel of a second slot which is a predetermined number of slots after the first slot.

According to the second solving means of this invention, there is provided a base station for communicating with a wireless terminal by specifying a radiation pattern for each channel in a time-division manner, comprising:

an array antenna for transmitting and receiving a pilot signal and data using a radiation pattern that is specified from among radiation patterns that include one of an omnidirectional manner and a directional manner according to a sector and a beam pattern;

a scheduler for specifying the radiation pattern and a beam direction;

a reverse-link beam controller for receiving a signal or data from the wireless terminal via the array antenna;

a demodulator for demodulating the signal or data received by the reverse-link beam controller;

a modulator for modulating a signal or data to the wireless terminal; and a forward-link beam controller for transmitting the modulated data or signal to the wireless terminal via the array antenna, wherein the scheduler outputs to the forward-link beam controller radiation pattern information for transmitting the pilot signal in a direction in which the wireless terminal is located, using a beam pattern;

in a first slot that includes a common pilot channel transmitted to the wireless terminal in an omnidirectional manner or in a directional manner according to a sector, an individual pilot channel transmitted using a specific beam pattern among a plurality of beam patterns, and a data channel for transmitting data to the wireless terminal using the beam pattern, the forward-link beam controller performs control, including synchronization, using the common pilot channel of the first slot and, using the individual pilot channel of the first slot, the forward-link beam controller transmits, a pilot signal using a radiation pattern including the beam pattern in the direction in which the wireless terminal is located, based on the radiation pattern information from the scheduler;

the reverse-link beam controller receives, via the array antenna, transmitted signal for requesting data rate determined by the wireless terminal located in the direction according to the reception quality of the pilot signal;

the demodulator demodulates the received signal to obtain the requested data rate;

a predetermined period after the first slot, the scheduler re-outputs the radiation pattern information to the forward-link beam controller and outputs to the modulator the data to be transmitted to the wireless terminal and the data rate obtained in the demodulator;

the modulator modulates the data to be transmitted to the wireless terminal according to the data rate from the scheduler, using a data channel of a second slot which occurs a predetermined number of slots after the first slot, and outputs the modulated data to the forward-link beam controller; and the forward-link beam controller transmits to the wireless terminal the data in the data channel of the second slot, which is modulated by the modulator, using the radiation pattern including the beam pattern in the same direction as the direction in which the pilot signal is transmitted, based on the radiation pattern information from the scheduler.

According to the third solving means of this invention, there is provided a wireless communication system comprising:

a plurality of base stations described above, wherein the plurality of base stations operate at the same slot timing; and a radiation pattern formed of beam patterns each of which is used by each base station for transmitting the pilot signal using the individual pilot channel of the first slot and a radiation pattern formed of beam patterns each of which is used by each base station for transmitting the data using the data channel of the second slot are the same.

According to the present invention, it is possible to perform data transmission using the most suitable data rate for the radiation pattern of an antenna, the data rate being used for a forward-link from a base station to a mobile station. It is also possible to improve the throughput. In addition, it is also possible with the present invention to use the same radiation beam pattern for both packet data transmission and pilot signal transmission.

DESCRIPTION OF THE PREFERRED
EMBODIMENTS OF THE INVENTION

A preferred embodiment of the present invention will be described below; however, the present invention is not limited thereto.

System Configuration

Figure 8:
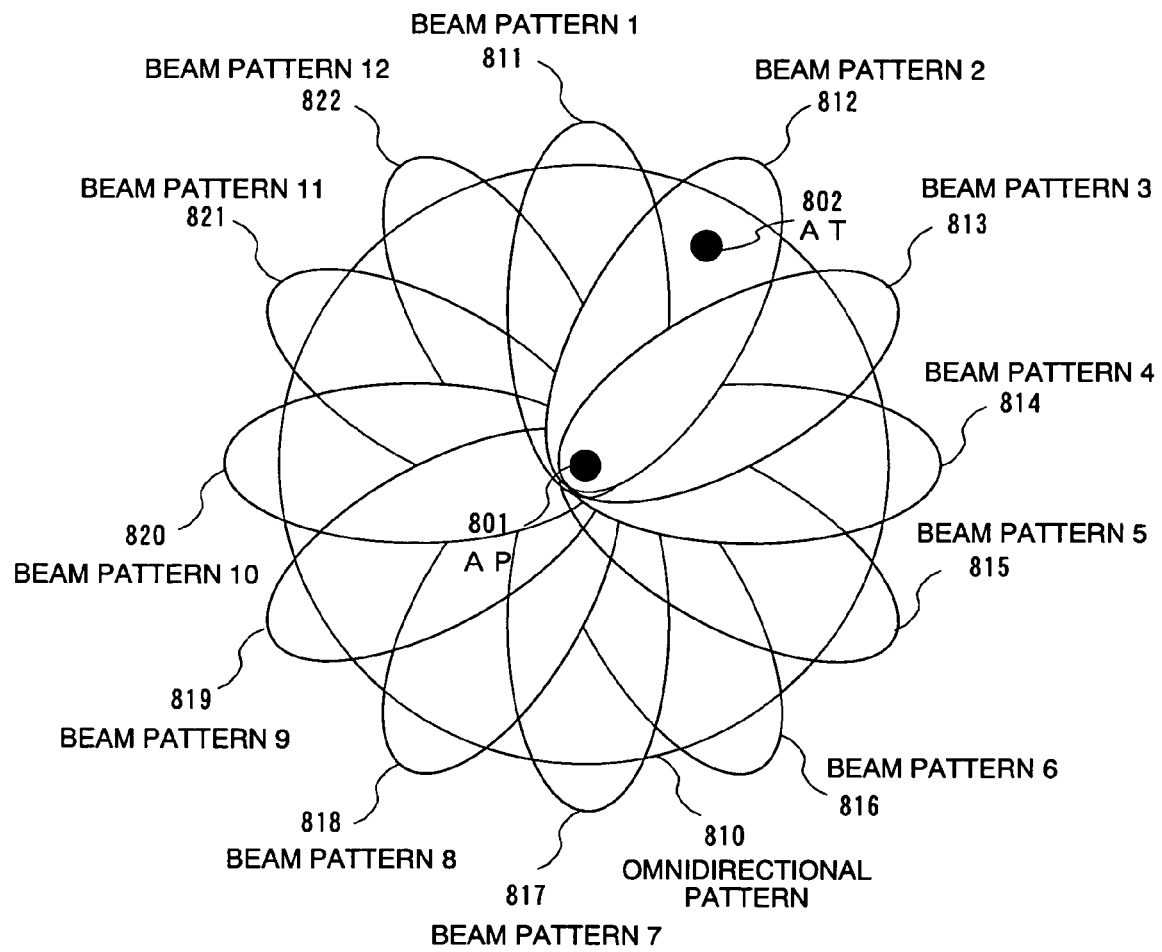
FIG. 8 is a diagram illustrating a wireless communication system.

FIG. 8 is a diagram showing the configuration of a wireless communication system according to the present embodiment, showing forward-link radiation beam patterns.

The wireless communication system includes a base station (AP) 801 and a mobile station (AT) 802. Although one base station 801 and one mobile station 802 are shown in the figure, a plurality of base stations 801 and a plurality of mobile stations 802 may be provided. The mobile station 802 is not limited to a mobile device; it may be any type of wireless terminal that is capable of wirelessly communicating with the base station 801.

The base station 801 transmits a common pilot signal (COMPLT) using an omnidirectional pattern 810, in other words, a radiation pattern that the mobile station 802 can receive, no matter in which direction the mobile station 802 is located. An individual pilot signal (BPLT) and a data channel (DATA) are transmitted using any one of individual radiation beam patterns 811 to 822, such as beam pattern 1 (811), beam pattern 2 (812), etc., which are narrow beams. For example, the base station 801 transmits using the most suitable radiation beam pattern for the target mobile station 802, in other words, using the radiation beam pattern that points towards the beam area where the mobile station 802 is located. The common pilot signal is transmitted to the mobile stations 802 managed by the base station 801, whereas the individual pilot signal is transmitted to a certain terminal or to a plurality of terminals in the same beam direction.

Figure 1:
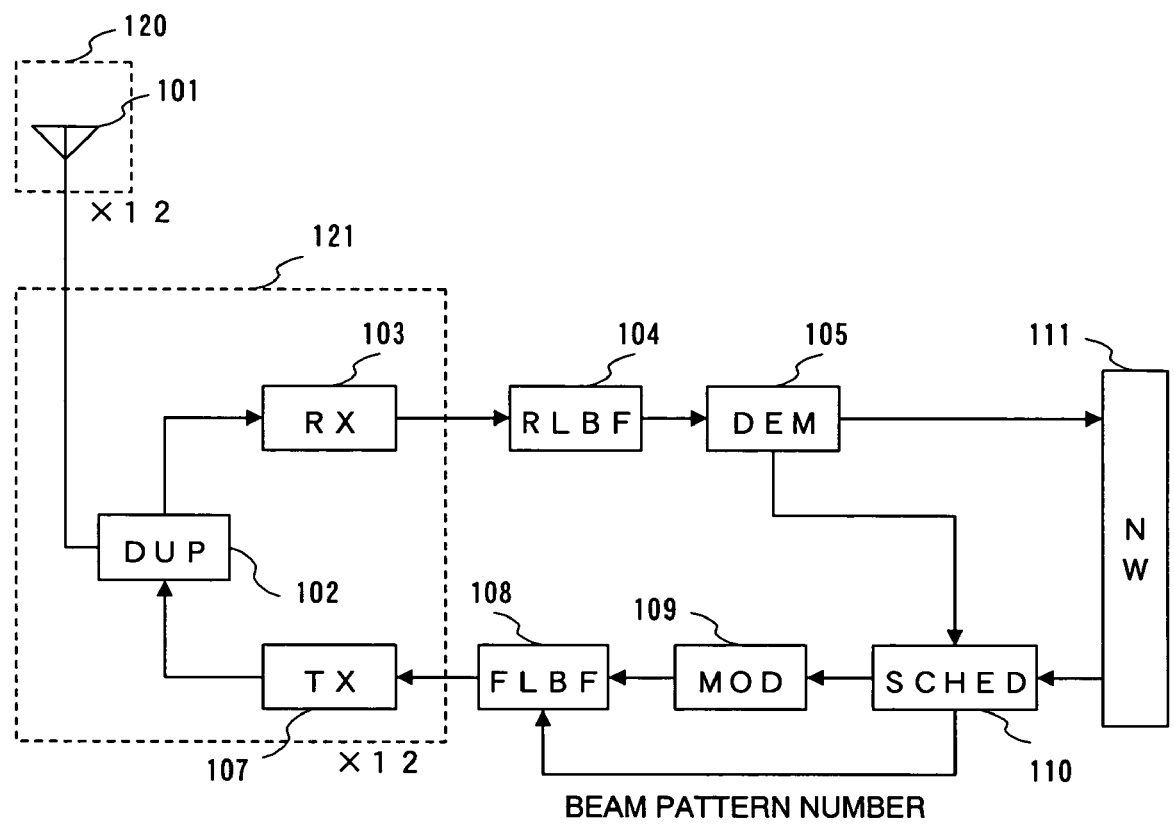
FIG. 1 is a diagram showing the configuration of a base station according to an embodiment of the present invention.

FIG. 1 is a diagram showing the configuration of the base station 801 according to the present embodiment.

The base station 801 includes an array antenna 120, a radio-frequency (RF) unit 121, a reverse-link beam controller (RLBF) 104, a demodulator (DEM) 105, a forward-link beam controller (FLBF) 108, a modulator (MOD) 109, a scheduler (SCHED) 110, and a network interface (NW) 111. The array antenna 120 includes a plurality of antenna elements 101. The RF unit 121 includes a duplexer (DUP) 102, a reception RF circuit (RX) 103, and a transmission RF circuit (TX) 107.

First, a reverse-link circuit in the base station 801 will be described. A reverse-link signal from the mobile station 802 is received by an antenna element 101 in the antenna array 120, passes through the duplexer (DUP) 102 in the RF unit 121, and is input to the reception RF circuit (RX) 103. The duplexer (DUP) 102 separates a reverse-link reception signal and a forward-link transmission signal; it can be constructed, for example, of band selection filters that select the respective signals or it can be constructed of a circulator. After amplifying and frequency converting the signal from the antenna element 101 to obtain a predetermined sensitivity, the reception RF circuit (RX) 103 converts the signal to a digital signal using an A/D converter.

As described above, the array antenna 120 includes the plurality of antenna elements 101. For example, when a twelve-element array antenna is used, the array antenna 120 includes twelve antenna elements 101, and the RF unit 121 is also provided with twelve duplexers (DUP) 102, twelve reception RF circuits (RX) 103, and twelve transmission RF circuits (TX) 107, corresponding to the number of antenna elements. Therefore, reverse-link signals from the antenna elements 101 are input to the reverse-link beam controller (RLBF) 104 from the twelve reception RF circuits (RX) 103. Similarly, the forward-link beam controller (FLBF) 108 outputs forward-link signals to the twelve transmission RF circuits (TX) 107.

The reverse-link signals from the twelve reception RF circuits (RX) 103 are input to the reverse-link beam controller (RLBF) 104, which then generates individual reverse-link beam coefficients for the plurality of mobile stations 802 and combines the twelve reverse-link signals in the form of a vector. By doing so, the reverse-link beam controller (RLBF) 104 receives signals in directions that are suitable for the respective mobile stations 802. Alternatively, the reverse-link beam controller (RLBF) 104 combines the twelve reverse-link signals into an omnidirectional pattern for reception using the same beam coefficient for all the mobile stations 802. The reverse-link beam controller (RLBF) 104 then outputs the reverse-link signal, combined using one of the methods described above, to the demodulator (DEM) 105.

The demodulator (DEM) 105 demodulates the reverse-link signal for each mobile station 802 using a back diffuser, RAKE synthesizer, decoder or the like installed therein. This reverse-link data signal is then input to the network interface (NW) 111 and is delivered to the network. The demodulator (DEM) 105 outputs requested forward-link data rates and area selection values, which are included in the demodulated reverse-link signal, to the scheduler (SCHED) 110. The requested forward-link data rates and the area selection values input to the scheduler (SCHED) 110 are used in a forward-link scheduling operation, which is described later. The above is a description of the reverse link.

Next, the forward link at the base station 801 will be described. A forward-link data signal input to the network interface (NW) 111 from the network is input to the scheduler (SCHED) 110. Based on the requested forward-link data rates and the area selection values input from the demodulator (DEM) 105, the scheduler (SCHED) 110 checks the requested rates for the plurality of mobile stations 802 and the areas in which the mobile stations 802 are located and determines the radiation beam pattern to be used when transmitting the forward-link data signal. In other words, it performs scheduling of the beams. The radiation beam pattern can be selected from among a plurality of beam patterns that are determined in advance, as shown in FIG. 8 for example. At this point, the scheduler (SCHED) 110 need not determine to which mobile stations 802 to transmit the forward-link data signal. The reason why is that there may be a plurality of mobile stations 802 in the same radiation beam pattern, for instance.

Next, the scheduler (SCHED) 110 outputs to the forward-link beam controller (FLBF) 108 the beam pattern numbers corresponding to the radiation beam patterns in a slot before the slot used for actually transmitting the forward-link data signal. The forward-link beam controller (FLBF) 108 then uses the radiation beam patterns corresponding to the input beam pattern numbers to transmit the individual pilot signals (BPLT) to the mobile stations 802. An offset (separation) between the slots of the forward-link data signal and the individual pilot signals, which are transmitted using the same radiation beam pattern, can be determined in advance as an intrinsic parameter of the system. If that offset is defined to be two slots, for example, the individual pilot signals are transmitted in a slot two slots before that used to transmit the forward-link data signal, using the same radiation beam pattern as the radiation beam pattern used to transmit the forward-link data signal. The beam pattern numbers are not limited to numbers; it is possible to use any type of information for identifying the beams or the directions of the beams, such as letters, angles, and so forth.

The individual pilot signals are output in a periodically repeating fashion with the use of the beam patterns, even if there is no forward-link transmission data to each mobile station 802 (that is, during an idling period). This is for identifying, for example, in which beam pattern the mobile station 802 falls, even when there is no forward-link packet data. The forward-link beam controller (FLBF) 108 outputs the common pilot signal using the omnidirectional pattern (a radiation pattern which points towards all mobile stations 802), separately from the individual pilot signals. The individual pilot signals and the common pilot signal are output in a time-division manner with different timings in the same slot, as described later.

Based on the requested forward-link data rates of the plurality of mobile stations 802, which were transmitted from the mobile stations 802 in response to the individual pilot signals and input from the demodulator (DEM) 105, the scheduler (SCHED) 110 determines the target mobile stations 802 to which to transmit the forward-link data signal using, for example, the proportional fairness algorithm or an alternative algorithm. In other words, it performs scheduling of the mobile stations 802. Then, two slots after the slot used to transmit the individual pilot signals, the scheduler (SCHED) 110 outputs the same radiation beam pattern numbers to the forward-link beam controller (FLBF) 108 and outputs the forward-link data signal and the requested forward-link data rates to the modulator (MOD) 109 in the same slot.

The modulator (MOD) 109 modulates the forward-link data signal using the requested forward-link data rates with an encoder, a diffuser, or the like contained therein, time-division multiplexes the common pilot signal, the individual pilot signals, an MAC (Medium Access Control) signal and so forth, and outputs them to the forward-link beam controller (FLBF) 108.

Using the radiation beam pattern numbers input from the scheduler (SCHED) 110, the forward-link beam controller (FLBF) 108 forms beams for the forward-link data signal, individual pilot signals, and so on that are time-division multiplexed by the modulator (MOD) 109. When forming the beams for the individual pilot signals, the forward-link beam controller (FLBF) 108 multiplies the individual pilot signal sequence with Walsh orthogonal codes, according to the radiation beam pattern numbers. This is for identifying, in the mobile stations 802, with which beam patterns the individual pilot signals were output. These signals, for which the beams were formed by the forward-link beam controller (FLBF) 108, are twelve forward-link signals which are output to the twelve corresponding transmission RF circuits (TX) 107. After converting the forward-link signals input from the forward-link beam controller (FLBF) 108 to analog signals using D/A converters, the respective transmission RF circuits (TX) 107 perform amplification, frequency conversion, and so forth on the signals. The transmission RF circuits (TX) 107 then output the converted forward-link signals to the antenna elements 101 constituting the array antenna 120 via the duplexers (DUP) 102, and the forward-link signals are radiated from the antenna elements 101. The above is a description of the forward link.

Figure 2:
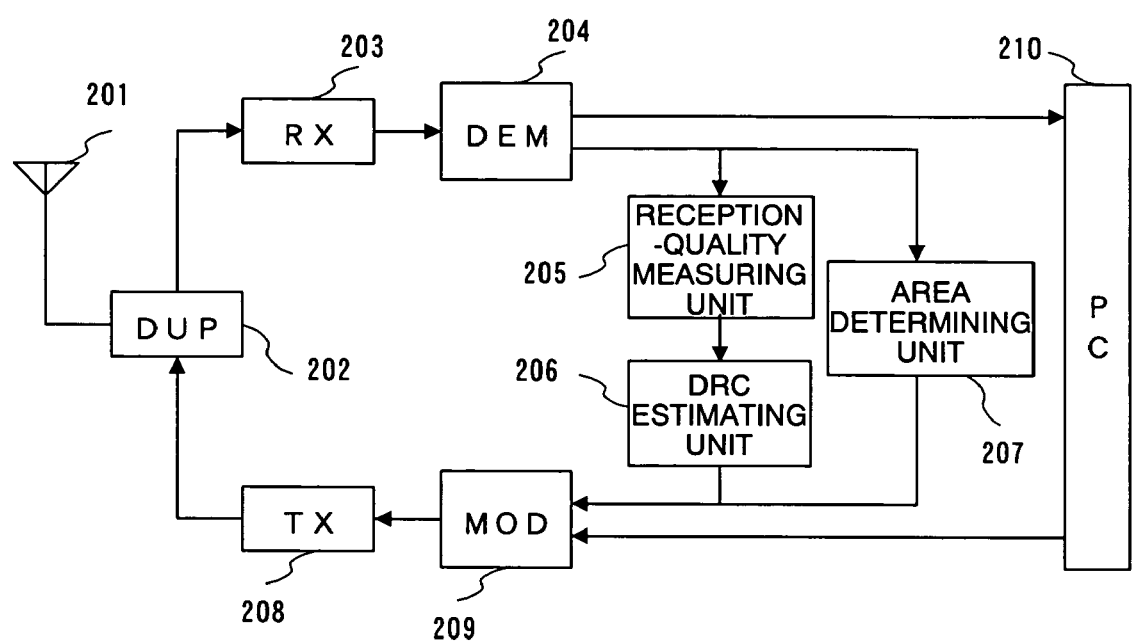
FIG. 2 is a diagram showing the configuration of a mobile station according to the present embodiment.

FIG. 2 is a diagram showing the configuration of the mobile station 802.

The mobile station 802 includes an antenna unit 201, a duplexer 202, a reception RF circuit (RX) 203, a demodulator (DEM) 204, a reception-quality measuring unit 205, a DRC estimating unit 206, an area determining unit 207, a transmission RF circuit (TX) 208, a modulator (MOD) 209, and a PC interface 210.

First, the forward link in the mobile station 802 will be described. A forward-link signal from the base station 801 is received by the antenna unit 201, passes through the duplexer (DUP) 202, and is input to the reception RF circuit (RX) 203. After subjecting the input forward-link signal to amplification, frequency conversion, and so forth to obtain a predetermined sensitivity, the reception RF circuit (RX) 203 converts the signal into a digital signal using an A/D converter and outputs it to the demodulator (DEM) 204. The demodulator (DEM) 204 demodulates the forward-link signal using a reverse diffuser, a RAKE synthesizer, a decoder, or the like contained therein and separates it into the forward-link data signal, the individual pilot signal, the common pilot signal, the MAC signal and so forth all time-division multiplexed. The forward-link data signal separated by the demodulator (DEM) 204 is output to the PC interface (PC) and is transferred to a higher-level layer.

The demodulator (DEM) 204 outputs the separated individual pilot signal to the reception-quality measuring unit 205 and the area determining unit 207. The reception-quality measuring unit 205 measures the reception quality (for example, the SIR) of the input individual pilot signal and outputs it to the DRC estimation unit 206. The DRC estimation unit 206 estimates the most suitable data rate to be requested for the forward link based on the input reception quality and outputs it to the modulator (MOD) 209. The area determining unit 207 determines which area the mobile station 802 is located, from the Walsh orthogonal code and the reception signal level of the input individual pilot signal and outputs the area selection value of the area to the modulator (MOD) 209.

Next, the reverse-link in the mobile station 802 will be described. A reverse-link data signal from the higher-level layer is input to the modulator (MOD) 209 via the PC interface 210. The modulator (MOD) 209 code multiplexes the reverse-link data signal, the forward-link data rate output from the DRC estimation unit 206, and the area selection value output from the area determining unit 207 and encodes, diffuses, and modulates them to generate a reverse-link signal. The reverse-link signal generated by the modulator (MOD) 209 is input to the transmission RF circuit (TX) 208, which then converts the signal to an analog signal using a D/A converter contained therein, followed by amplification, frequency conversion, and so forth. The converted signal passes through the duplexer (DUP) 202 and is radiated by the antenna unit 201.

Time-Division Channel Structure

Figure 4:
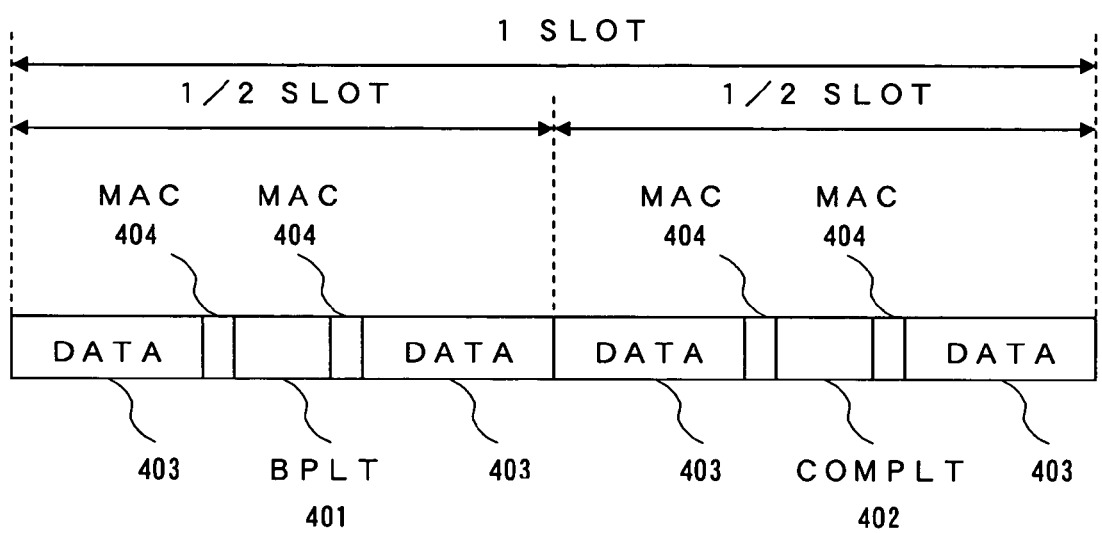
FIG. 4 shows a time-division channel structure in the present embodiment.

FIG. 4 is a diagram showing the structure of forward-link time-division channels according to the present embodiment.

FIG. 4 shows the forward-link time-division channel structure for a single slot, where the horizontal direction indicates time. The forward-link time-division channels in the present embodiment include an individual beam pilot channel (BPLT) 401 for each individual mobile station 802, a common beam pilot channel (COMPLT) 402 for all mobile stations 802, data channels (DATA) 403 and MAC channels (MAC) 404.

One difference from the technology in the related art is that pilot channels are separated in a time-division manner according to their purposes (BPLT for each individual mobile station, and COMPLT for all mobile stations). When the base station 801 transmits these pilot channels separated according to their purposes (BPLT and COMPLT), it transmits each pilot signal using its own corresponding radiation pattern in a respective direction. Therefore, the base station 801 according to the present invention is an array-antenna base station in which the radiation pattern for each channel in each slot can be set and changed in a desired way.

The common pilot channel (COMPLT) 402 is used, for example, in an asynchronous state, that is, directly after turning on the power or when hand-off occurs to pass the control to the base station 801, to achieve synchronization, or for channel detection when receiving a control channel. These operations are not carried out only in the mobile station 802 which falls in a specified narrow radiation beam pattern; they are required in all mobile stations 802 Therefore, the common pilot channel (COMPLT) 402 is transmitted with an omnidirectional pattern, that is, with a (nondirectional) radiation pattern which can be received by the mobile stations 802 in all directions. In contrast, the individual beam pilot channel (BPLT) 401 is transmitted with a narrow-beam radiation pattern.

In conventional cellular system base stations which do not have an array-antenna function, the radiation pattern for each channel is always fixed. Even if they do have an array-antenna function, the pilot channel in the conventional function is not separated into BPLT and COMPLT channels but is always fixed, that is, BPLT and COMPLT occupy the same channel. In other words, the pilot channel is radiated with either an omnidirectional pattern or a sector pattern.

For the DATA channels, on the other hand, the radiation pattern is set to be in the direction of the mobile station 802 for each slot. However, since its radiation beam pattern can use a different pattern from that of the pilot channels, the conditions of the propagation path of the pilot channels and the data channels may differ, which may make it difficult to estimate the reception quality of the data channels. Accordingly, it may be impossible to select a correct forward-link transmission data rate. This problem can be overcome by using the present embodiment.

Figure 5:
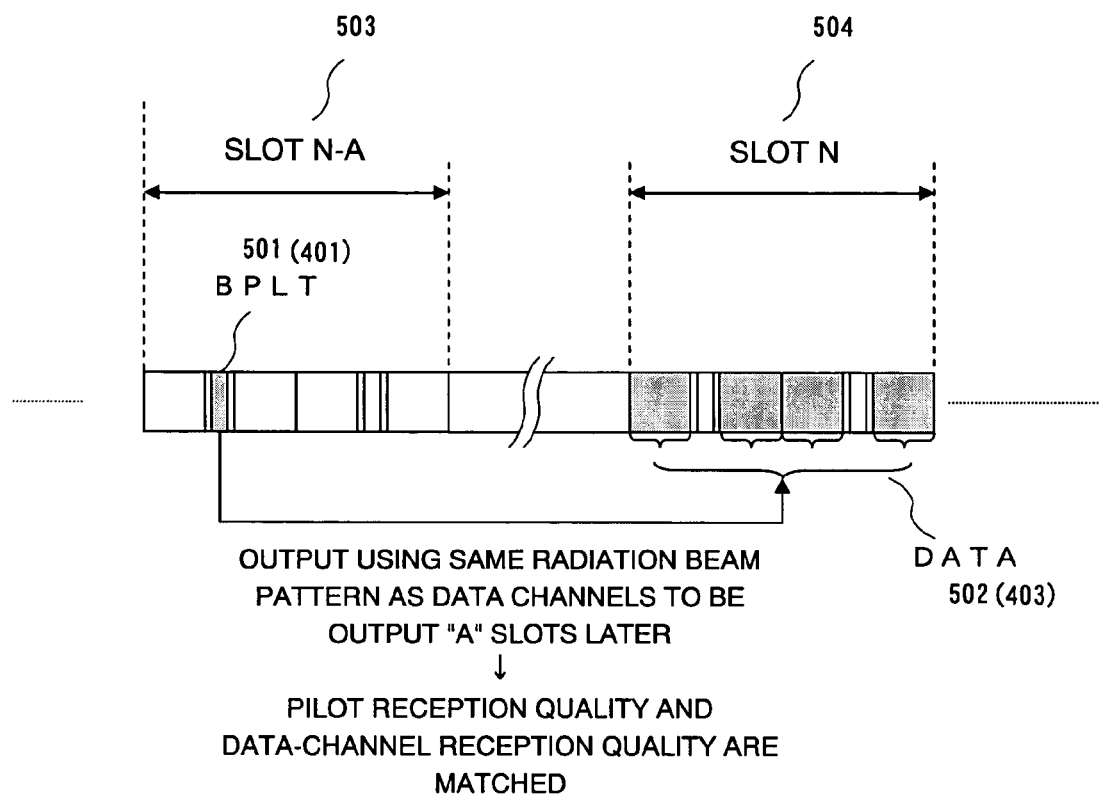
FIG. 5 is a diagram illustrating radiation beam assignment of forward-link slots in the present embodiment.

FIG. 5 is a diagram illustrating the radiated beam assignment for the forward-link slots in the present embodiment.

FIG. 5 shows slots, with time indicated in the horizontal direction. In the present embodiment, the base station 801 transmits data channels (DATA) 502 of a certain slot N 504 and an individual pilot channel (BPLT) 501 of a slot N-A 503, which is A slots before slot N 504, using the same radiation beam pattern. This radiation beam pattern is determined in the scheduler 110 in the base station 801 based on the requested forward-link data rate and the area selection value sent from the mobile station 802, which are received at the base station 801. Accordingly, the pilot reception quality and the forward-link channel reception quality are the same, which allows the forward-link transmission data rate to be determined with high estimation accuracy. In FIG. 5, "A" indicates an offset between the slot for transmitting the individual pilot channel and the slot for transmitting the forward-link data channels. For example, if the offset is two slots (A=2), the individual pilot channel is transmitted in the slot which is two slots before the slot for transmitting the forward-link data channels, using the same radiation beam pattern.

The offset can be determined in advance according to the separation between slots, the time required from transmitting the individual pilot signal to receiving the DRC request, and so forth. With the common pilot channel and the individual pilot channel in the same slot, it is possible to reduce the offset by transmitting the individual pilot channel with an earlier timing.

Operation of Base Station and Mobile Station

Figure 3:
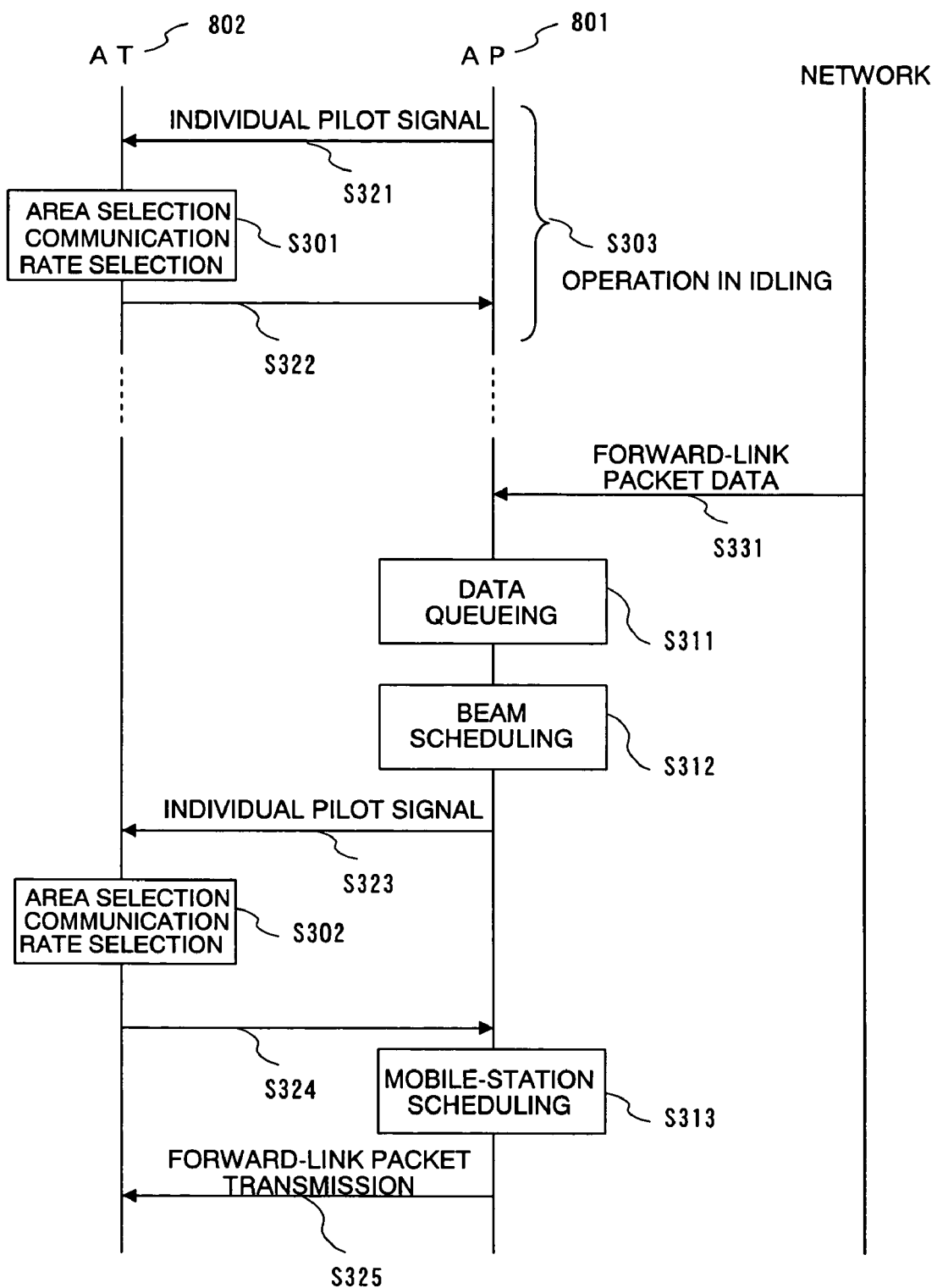
FIG. 3 is a sequence diagram of the present embodiment.

FIG. 3 shows a sequence diagram of the present embodiment.

FIG. 3 shows the progress of time from top to bottom. In this figure and in the following description, one base station (hereinafter referred to as AP) 801 and one mobile station (hereinafter referred to as AT) 802 forming a pair will be considered.

First, the operation performed when no forward-link packet data is transmitted from the network, that is, in an idle state, will be described (in step S303). The AP 801 radiates individual pilot signals while repeatedly switching the radiation beam pattern (in step S321). For example, it radiates while sequentially switching from beam pattern 1 (811) to beam pattern 12 (822) shown in FIG. 8. Also, an AP 801 with a sector configuration radiates the individual pilot signals while switching the beam pattern in each sector. For example, if beam patterns 1 to 4 (811 to 814) shown in FIG. 8 form one sector, each beam pattern is repeated and radiated in a sequentially switching manner. By multiplying this individual pilot signal with a Walsh orthogonal code which corresponds to the radiation beam pattern, it is possible, at the AT 802, to identify which beam pattern is the radiation beam pattern.

The AT 802 receives the transmitted individual pilot signal (in step S321). The AT 802 then performs area selection and communication rate selection (in step S301). For example, the AT 802 decodes the Walsh orthogonal code to identify the beam pattern of the received individual pilot signal, in other words, the beam area number. Among the plurality of individual pilot signals transmitted in a repeatedly switching manner from the AP 801, the AT 802 recognizes its own area by selecting the individual pilot signal having the highest reception power level and selecting the corresponding beam area number. In addition, the AT 802 measures the reception quality (SIR) of the individual pilot signal and selects a forward-link transmission rate that is appropriate for the forward-link reception quality. The AT 802 then transmits the selected beam area number and forward-link transmission rate to the AP 801 (in step S322). The processes in steps S301 and S322 can be executed by a plurality of ATs 802 which have received the individual pilot signals.

Based on the beam area number transmitted from the AT 802, the AP 801 knows in which beam area the AT 802 is located. This also applies to cases where a plurality of ATs 802 are connected to the AP 801. Based on the beam area numbers reported by the plurality of ATs 802 at the same time or substantially the same time, the AP 801 knows in which beam areas the ATs 802 are located. The above is an example of the operation in the idle state (in step S303). The operation to determine in which beam area the AT 802 is located is exactly the same when a forward-link transmission packet is generated after the idle state and is performed in parallel.

A case where a forward-link transmission packet is generated will be described next.

When forward-link packet data is input to the AP 801 from the network via the NW 111 (in step S331), the AP 801 initially queues the data (in step S311). When a plurality of ATs 802 are connected, there is a separate data queue for each AT 802, and data queuing is performed for the ATs 802 according to the destination AT 802 for the forward-link packet data, for example. The forward-link packet data from the NW 111 may be simultaneously forwarded to the individual ATs 802. In addition, because the forward-link packet data may be forwarded from the NW 111 more quickly than the speed at which it is transmitted to the ATs 802, the data may pile up in the respective data queues for the plurality of ATs 802 at the same time or at substantially the same time.

Next, the AP 801 performs beam scheduling (in step S312). For example, of the plurality of ATs 802, the AP 801 refers to the requested forward-link transmission rates (DRC: Data Rate Control) transmitted from the respective ATs 802 in the process described above (in step S322) and selects the beam area containing the AT 802 with the highest DRC. Alternatively, if the AP 801 communicates with the AT 802 before then, it measures an average forward-link rate (R) for each AT 802, obtains the value DRC/R, and selects the beam area containing the AT 802 with the highest value. In other words, the AP 801 selects the beam area using the proportional fairness algorithm.

If there is only one AT 802 for which there is data in the data queue during beam scheduling, the AP 801 selects the beam area for that AT 802. If there are a plurality of ATs 802 for which there is data in the data queues and all of those ATs 802 are in the same beam area, the AP 801 selects the beam area for the plurality of ATs 802 in the same way. The AP 801 need not determine to which AT 802 to transmit the data when beam scheduling is performed; what is important is that it determines the radiation beam pattern in a certain slot.

Next, the AP 801 transmits (in step S323) an individual pilot signal to the AT 802 using the radiation beam pattern for outputting radio waves to the radiated beam area selected in the beam scheduling step (in step S312). Also, the AP 801 performs control, including synchronization, using the common pilot channel in the same slot. The slot for transmitting this individual pilot signal and the slot for transmitting the later forward-link packet data, using the same radiation beam pattern selected in the beam scheduling step (in step S312), are different. For example, the AP 801 transmits the forward-link packet data using the same radiation beam pattern two slots after the slot for transmitting the individual pilot signal. The slot relationship of this radiation beam pattern will be described in detail later. Similarly, an important issue for maintaining this slot relationship will also be described later.

Next, the AT 802 receives (in step S323) the individual pilot signal transmitted by the AP 801 using the radiation beam pattern selected in the beam scheduling step (in step S312). The AT 802 performs area selection and communication rate selection (in step S302). For example, the AT 802 decodes the Walsh orthogonal code to identify the beam pattern, that is to say, the beam area number. In addition, the AT 802 measures the reception quality (SIR) of the individual pilot signal and selects a forward-link transmission rate that is suitable for the forward-link reception quality. The AT 802 then transmits the beam area number and the forward-link transmission rate to the AP 801 (in step S324). These operations of the AT 802 are the same as those in the idle state (in step S303); it is not particularly necessary to decide, at the AT 802, whether or not the system is in the idle state. When there is a plurality of ATs 802 in the same beam area, those ATs 802 transmit (in step S324) their beam area numbers and forward-link transmission rates.

Next, the AP 801 performs mobile station scheduling (in step S313). For example, using the radiation beam pattern selected in the beam scheduling step (in step S312), the AP 801 receives (in step S324) from the plurality of ATs 802 the requested forward-link transmission rates (DRC) corresponding to the individual pilot signals transmitted in step S323. From the plurality of ATs 802, the AP 801 selects the AT 802 with the highest DRC. Alternatively, if the AP 801 communicates with the AT 802 before this, it measures an average forward-link rate (R) for each AT 802, obtains the value DRC/R, and selects the AT 802 for which this value is highest. In other words, the AP 801 selects the AT 802 using the proportional fairness algorithm. If there is only one AT 802 for which there is data in the data queue during mobile station scheduling, the AP 801 selects that AT 802.

According to the requested rate which the selected AT 802 transmits, the AP 801 generates a forward-link packet for that AT 802 using a modulation method and encoding ratio corresponding to that rate. The AP 801 transmits the forward-link packet (in step S325) using the same radiation beam pattern as the individual pilot signal transmitted in step S323. Accordingly, the reception quality of the individual pilot signal used in selecting the forward-link transmission rate and the actual reception quality of the forward-link data channel are the same, which allows the forward-link transmission data rate to be determined with high estimation accuracy. The processes described in steps S312 to S325 above can be repeatedly executed whenever there is data in the data queues.

Forward-Link Slot Structure

Figure 6:
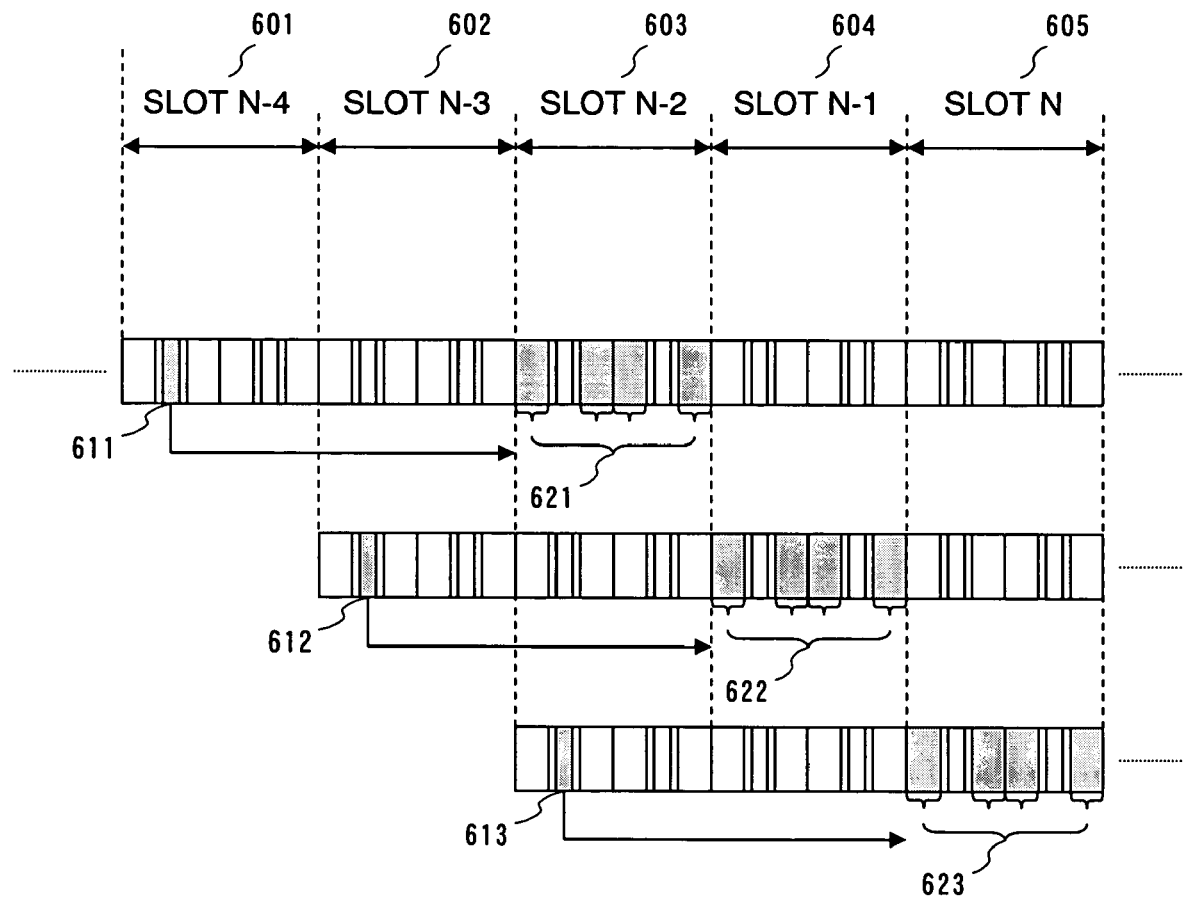
FIG. 6 is a diagram illustrating radiation beam correspondence for each forward-link slot in the present embodiment.

FIG. 6 is a diagram illustrating the radiation beam correspondence of each forward-link slot in the present embodiment.

FIG. 6 shows a plurality of slots (N-4, N-3, ... , and N) 601 to 605, with time indicated in the horizontal direction. This example shows the correspondence of radiation beam patterns in a case where the offset between a slot for an individual pilot channel and a slot for the forward-link data channels, which are transmitted using the same radiation beam pattern, is two slots. The offset is not limited to two slots, however, and may be any number of slots. Data channels 621 in slot N-2 603 are transmitted with the same beam pattern (for example, beam pattern 1) as an individual pilot channel 611 in slot N-4 601. Similarly, data channels 622 in slot N-1 604 and an individual pilot channel 612 in slot N-3 602 are transmitted with the same beam pattern (for example, beam pattern 2). Data channels 623 in slot N 605 and an individual pilot channel 613 in slot N-2 603 are transmitted using the same beam pattern (for example, beam pattern 3). Therefore, the data channels and the corresponding individual pilot channel are shifted by two slots. In addition, the data channels in each slot maintain the same correspondence relationship even if they use different radiation beam patterns. Therefore, the reception quality of a pilot channel and the reception quality of the corresponding forward-link data channels are the same, which allows the forward-link transmission data rate to be determined with high estimation accuracy. Furthermore, by enabling dynamic beam pattern assignment and mobile station assignment for each slot, it is possible to improve the throughput.

Figure 7:
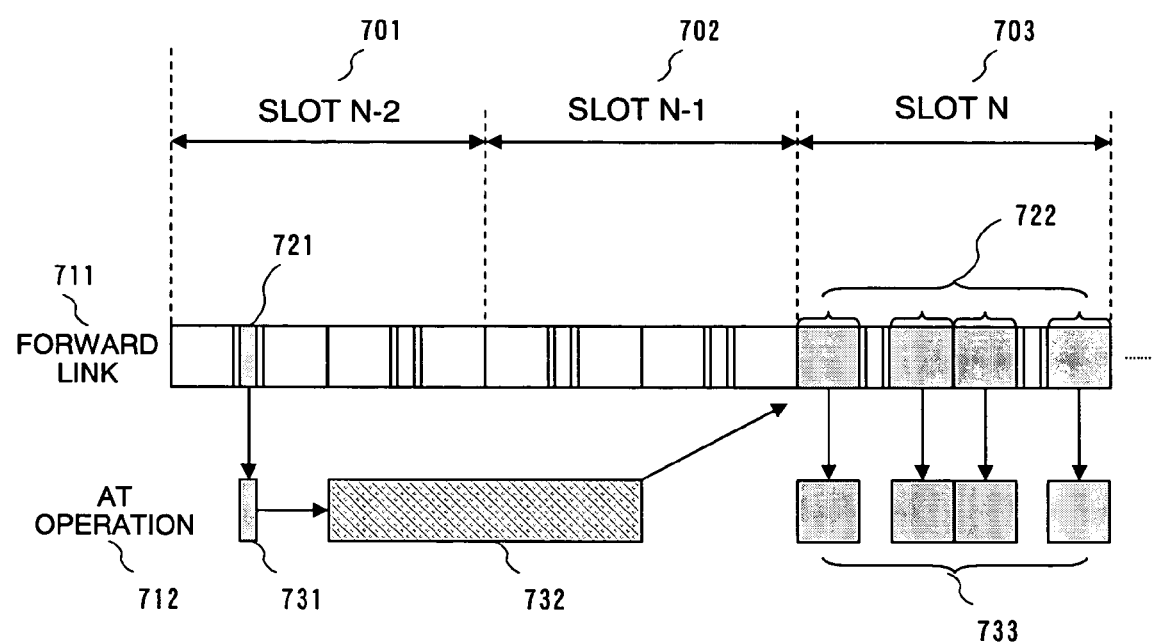
FIG. 7 is a diagram illustrating the correspondence between the forward-link slots and the operation of the mobile station (AT) in the present embodiment.

FIG. 7 is a diagram illustrating the correspondence of the forward-link slots and the operation of the AT 802 in the present embodiment.

FIG. 7 shows a forward-link 711 and the operation (712) of the AT 802, with time indicated in the horizontal direction. This figure shows a case in which the offset between the slot for the individual pilot channel and the slot for the forward-link data channel, which are transmitted using the same radiation beam pattern, is two slots. Data channels 722 in a slot N 703 of the forward-link 711 and an individual pilot channel 721 in a slot N-2 701 are transmitted with the same radiation beam pattern. The AT 802 receives the individual pilot channel 721 of the slot N-2 701 and measures the reception quality thereof using the reception-quality measuring unit 205 (in step 731). The DRC estimation unit 206 of the AT 802 performs propagation path estimation using the reception quality and selects an appropriate forward-link data rate for that forward-link propagation path.

Next, the AT 802 requests this forward-link transmission data rate from the AP 801 using an identifier corresponding to the forward-link data rate (in step 732). Based on the requested rate, the AP 801 generates a forward-link packet for the AT 802 using a modulation method and encoding ratio corresponding to the rate and transmits the forward-link data channels 722 using the same radiation beam pattern as that for the individual pilot channel 721 transmitted in the slot N-2 701. At the rate used to request the forward-link transmission data rate (in step 732), the AT 802 receives the forward-link data channels 722 and demodulates the data (in step 733). Accordingly, the forward-link channel propagation path estimate and the actual reception quality of the forward-link data channels are the same, which allows the forward-link transmission data rate to be determined with high estimation accuracy.

Base Station Having Sector Configuration

The AP 801 can also have a sector configuration. In the AP 801 having the sector configuration, one sector is formed of a certain number of beam patterns. For example, the sector configuration can have sectors 1 to 3, where sector 1 is a combination of beam patterns 1 to 4 (811 to 814) shown in FIG. 8, sector 2 is a combination of beam patterns 5 to 8 (815 to 818), and sector 3 is a combination of beam patterns 9 to 12 (819 to 822). When the AP 801 has a sector configuration, each sector is provided with its own independent block configuration shown in FIG. 1. Alternatively, a part of the block configuration shown in FIG. 1 is shared among sectors. Each sector has its own independent scheduler, and the sectors simultaneously use a channel structure such as that shown in FIG. 4 to transmit BPLT, DATA and so on. The base station described above transmits the common pilot channel using the omnidirectional pattern, but it may transmit the common pilot channel using directional patterns corresponding to the sectors.

One important point here is that BPLT and DATA in each sector should have the relationship shown in FIG. 5; that is, BPLT and DATA, which occurs A slots after BPLT, are transmitted using the same radiation beam pattern. When the individual pilot channel is transmitted using a radiation pattern formed for each sector, for example, with beam pattern 1, beam pattern 5, and beam pattern 9 in FIG. 8, the data channels are also transmitted A slots later using beam patterns 1, 5, and 9. The radiation beam pattern used to transmit in each sector causes side lobes in a narrow beam; in other words, there is a certain level of interference with the beams in other directions. If reflection occurs in other directions due to reflections from buildings or the like, there is also interference with other sectors. Therefore, if the relationship shown in FIG. 5 is not maintained, the reception quality of the individual pilot channel (BPLT) and the reception quality of the data channels (DATA) received at the AT 802 are different. For example, when the individual pilot signal is transmitted using the radiation pattern formed of beam patterns 1, 5, and 9, and the data channels are transmitted using the radiation pattern formed of beam patterns 1, 5, and 12, beam pattern 1 experiences strong interference from beam pattern 12, and the reception quality may differ from that obtained when transmitting the individual pilot signal. In other words, by maintaining the relationship shown in FIG. 5 between BPLT and DATA in each sector, the radiation patterns are the same, and the estimate for the forward-link channel propagation path and the actual reception quality of the forward-link data channels are the same. This allows the forward-link transmission rate to be determined with high estimation accuracy. This also applies to interference from a neighboring AP 801.

Multiple Base Station Configuration

Figure 9:
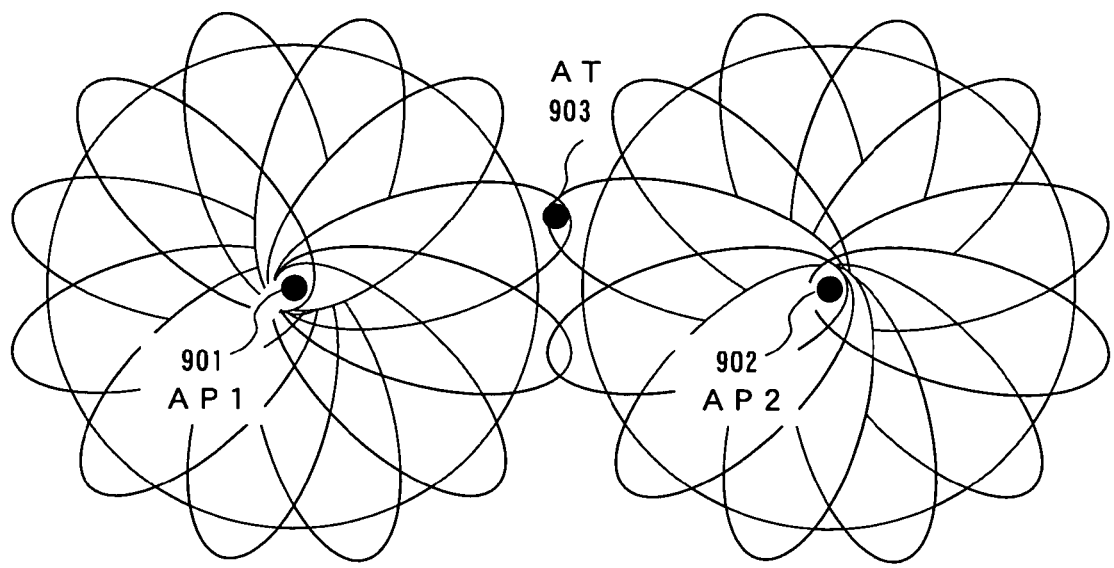
FIG. 9 is a diagram showing a multiple base station configuration of the present embodiment.

FIG. 9 is a diagram showing a multiple base station configuration in the present embodiment.

In FIG. 9, the beam areas of AP1 901 and AP2 902 overlap, which causes interference at the ends of those areas. Here, BPLT and DATA of each AP, or each sector forming each AP, have the relationship shown in FIG. 5; that is, BPLT and DATA, which occurs A slots after BPLT, are transmitted using the same radiation beam pattern. The radiation beam pattern used for transmission by each AP, or each sector forming each AP, causes interference with the neighboring AP. Interference also occurs if there is reflection towards the neighboring AP due to reflections from buildings or the like. Therefore, if the relationship shown in FIG. 5 is not maintained, the reception quality of the individual pilot channel (BPLT) and the reception quality of the data channels (DATA) received at an AT are different. For example, the beam pattern of the AP1 901 when transmitting BPLT, the radiation pattern formed of the beam pattern of the AP2 902, and the radiation pattern of the beam pattern when transmitting DATA are made the same.

If the offset A shown in FIG. 5 is the same for each AP or each sector, the radiation pattern from each AP or each sector will be the same. In other words, by maintaining the relationship shown in FIG. 5 for the BPLT and DATA channels of each AP or each sector forming each AP, the estimate for the forward-link channel propagation path and the actual reception quality for the forward-link data channel are the same, which allows the forward-link transmission data rate to be determined with high estimation accuracy.

The present invention can be applied to technologies including base stations performing cellular communication, array-antenna wireless devices provided with a plurality of antenna elements, base stations that generate beams to perform time-division packet transmission, and wireless communication systems.

What is claimed is:

1. A base station for communicating with a wireless terminal by specifying a radiation pattern for each channel in a time-division manner, comprising:
   an array antenna for transmitting and receiving a pilot signal and data using a radiation pattern that is specified from among radiation patterns that include one of an omnidirectional manner and a directional manner according to a sector and a beam pattern;
   a scheduler for specifying the radiation pattern and a direction of the beam pattern;
   a reverse-link beam controller for receiving a first signal or data from the wireless terminal via the array antenna;
   a demodulator for demodulating the first signal or data received by the reverse-link beam controller;
   a modulator for modulating a second signal or data to the wireless terminal; and
   a forward-link beam controller for transmitting the modulated second signal or data to the wireless terminal via the array antenna,
   wherein
   the scheduler outputs to the forward-link beam controller radiation pattern information for transmitting the pilot signal in a direction in which the wireless terminal is located, using the beam pattern;
   transmitting a first slot that includes a common pilot channel transmitted to the wireless terminal in an omnidirectional manner or in a directional manner according to a sector, an individual pilot channel transmitted using the beam pattern among a plurality of beam patterns, and a data channel for transmitting data to the wireless terminal using the beam pattern, the forward-link beam controller performs control, including synchronization, using the common pilot channel of the first slot and, using the individual pilot channel of the first slot, the forward-link beam controller transmits, a pilot signal using the radiation pattern including the beam pattern in the direction in which the wireless terminal is located, based on the radiation pattern information from the scheduler;
   the reverse-link beam controller receives, via the array antenna, a transmitted signal for requesting data rate determined by the wireless terminal located in the direction according to the reception quality of the pilot signal;
   the demodulator demodulates the received signal to obtain the requested data rate;
   a predetermined period after the first slot, the scheduler re-outputs the radiation pattern information to the forward-link beam controller and outputs to the modulator the data to be transmitted to the wireless terminal and the data rate obtained in the demodulator;

the modulator modulates the data to be transmitted to the wireless terminal according to the data rate from the scheduler, using a data channel of a second slot which occurs a predetermined number of slots after the first slot, and outputs the modulated data to the forward-link beam controller; and the forward-link beam controller transmits to the wireless terminal the data in the data channel of the second slot, which is modulated by the modulator, using the radiation pattern including the beam pattern in the same direction as the direction in which the pilot signal is transmitted, based on the radiation pattern information from the scheduler.

2. A base station according to claim 1, wherein the base station comprises a plurality of sectors;

the base station operates at the same slot timing in each sector; and a radiation pattern formed of beam patterns each of which is used by each of sectors for transmitting the pilot signal using the individual pilot channel of the first slot and a radiation pattern formed of beam patterns each of which is used by each of sectors for transmitting the data using the data channel of the second slot are the same.

3. A base station according to claim 2, wherein the separation between the first slot and the second slot is the same in each sector.

4. A wireless data-communication system comprising: a plurality of base stations according to claim 1, wherein the plurality of base stations operate at the same slot timing; and a radiation pattern formed of beam patterns each of which is used by each base station for transmitting the pilot signal using the individual pilot channel of the first slot and a radiation pattern formed of beam patterns each of which is used by each base station for transmitting the data using the data channel of the second slot are the same.

5. A wireless data-communication system according to claim 4, wherein the separation between the first slot and the second slot is the same in each base station.

* * * * *